US011543055B2

(12) United States Patent
Harrop et al.

(10) Patent No.: US 11,543,055 B2
(45) Date of Patent: Jan. 3, 2023

(54) PIPE TENSIONER

(71) Applicant: TECHNIP FRANCE, Courbevoie (FR)

(72) Inventors: Andrew Harrop, Aberdeen (GB);
Ludovic Lacan, Aberdeen (GB);
Martin Pierre, Aberdeen (GB); Paul McMillan, Glasgow (GB)

(73) Assignee: TECHNIP FRANCE

( * ) Notice: Subject to any disclaimer, the term of this patent is extended or adjusted under 35 U.S.C. 154(b) by 0 days.

(21) Appl. No.: 16/604,582

(22) PCT Filed: Oct. 4, 2017

(86) PCT No.: PCT/IB2017/001386
§ 371 (c)(1),
(2) Date: Oct. 11, 2019

(87) PCT Pub. No.: WO2018/189567
PCT Pub. Date: Oct. 18, 2018

(65) Prior Publication Data
US 2021/0116051 A1 Apr. 22, 2021

(30) Foreign Application Priority Data
Apr. 12, 2017 (GB) .................................... 1705887

(51) Int. Cl.
*F16L 1/23* (2006.01)
*G01L 5/1627* (2020.01)
*F16L 1/235* (2006.01)
*G01L 5/101* (2020.01)

(52) U.S. Cl.
CPC ................ *F16L 1/23* (2013.01); *F16L 1/235* (2013.01); *G01L 5/101* (2013.01); *G01L 5/1627* (2020.01)

(58) Field of Classification Search
CPC ...................................................... G01L 5/101
USPC ......... 198/626.3, 626.5, 626.6; 226/172, 173
See application file for complete search history.

(56) References Cited

U.S. PATENT DOCUMENTS

| 3,658,222 A | 4/1972 | Dressel et al. ................... 226/25 |
| 3,739,971 A | 6/1973 | Silvestri et al. ............... 226/172 |
| 4,776,221 A * | 10/1988 | Friis .......................... G01L 5/10 |
| | | 73/862.042 |

(Continued)

FOREIGN PATENT DOCUMENTS

| CA | 2 847 179 | 3/2013 |
| CN | 102562059 A | 7/2012 |
| GB | 1 339 654 A | 12/1973 |
| WO | WO 93/06401 A1 | 4/1993 |
| WO | WO 2013/033568 A3 | 3/2013 |

OTHER PUBLICATIONS

International Preliminary Report on Patentability dated Oct. 15, 2019 issued in corresponding International Patent Application No. PCT/IB2017/001386.

(Continued)

*Primary Examiner* — Sean D Andrish
(74) *Attorney, Agent, or Firm* — Ostrolenk Faber LLP

(57) ABSTRACT

A pipe tensioner for laying or recovering a subsea pipeline comprising at least two opposing continuous tracks able to hold the subsea pipeline, each track having a plurality of pads mounted on the continuous track for contacting the subsea pipeline, characterised in that at least one pad is a load pad comprising one or more load sensors for measuring loading on the load pad during handling of the subsea pipeline.

21 Claims, 6 Drawing Sheets

(56) References Cited

U.S. PATENT DOCUMENTS

| | | | |
|---|---|---|---|
| 5,533,834 A * | 7/1996 | Recalde | F16L 1/202 |
| | | | 405/166 |
| 5,718,538 A | 2/1998 | Recalde | 405/168.1 |
| 7,189,028 B1 | 3/2007 | Signaroldi et al. | 405/166 |
| 7,673,739 B2 | 3/2010 | Freeman | 198/810.02 |
| 2011/0033243 A1 | 2/2011 | Roodenburg et al. | 405/168.4 |

OTHER PUBLICATIONS

Combined Search Report and Examination Report dated Sep. 28, 2017 issued in corresponding GB Patent Application No. GB1705887.6.

Daisuke Inoue et al. "Distributed Tactile Sensors for Tracked Robots"; IEEE Sensors (2006), EXCO, pp. 1309-1312.

Shawn C. Kimmel et al. "Real-time soil compaction monitoring through pad strain measurements: modeling to inform strain gage placement" (2011), Smart Materials and Structure (7 pages).

Third Party Submission dated Feb. 20, 2020 in European Patent Application No. EP 20170804938 (2 separate documents).

Examination Report dated Oct. 23, 2020 issued in corresponding European Patent Application No. 17804938.3.

Alex MacKinnon, "Testing under Tension", Offshore Engineer (2014) (3 pages).

Application Note, "LCM 4550, LCM 4558, LCM 4559—Dual Bridge Load Pins" (2017) (2 pages).

IMCA Safety Flash (2016) (4 pages).

* cited by examiner

PIPE TENSIONER

CROSS-REFERENCE TO RELATED APPLICATIONS

The present application is a 35 U.S.C. §§ 371 national phase conversion of PCT/IB2017/001386, filed Oct. 4, 2017, which claims priority to United Kingdom Patent Application No. 1705887.6, filed Apr. 12, 2017, the contents of which are incorporated herein by reference. The PCT International Application was published in the English language.

BACKGROUND

Subsea marine pipelines are well known in the art for transporting fluids, for example hydrocarbons such as oil and gas. Such pipelines can be laid on a seabed or a sea floor for the passage of fluids between two sites, such as a production well or well head and an adjacent production platform. Such pipelines also need to be recovered from a sea bed after use.

Three methods of laying a pipeline are employed and depend on the depth of the seabed. A first method, called J Lay, consists of constructing the pipeline on a vertical assembly line and laying it in a vertical position. This method is particularly suitable for laying underwater pipelines in very deep water (generally, a depth greater than 1500 m). When the seabed is not very deep (generally, a depth of less than 1500 m), in a second method called S Lay the pipeline is laid in a horizontal configuration. Subsea pipelines are generally laid from a pipe-laying vessel, sometimes termed a marine pipelay vessel. Where the pipeline has sufficient flexibility, a third method may be employed in which the pipeline can be formed 'on-shore' and located on a large storage drum or reel on the pipe-laying vessel for subsequent laying 'off-shore' directly from the reel. This is generally termed in the art 'reel-laying'. For this, the pipeline needs to be reeled or spooled both onto and later off from the reel, based on controlled movement, which can be provided by a suitable tensioning assembly.

For laying, the pipe-laying vessel usually has a marine pipelay assembly thereon, such as a tower, for organising the pipeline from the vessel into the sea. The marine pipelay assembly may control the direction, speed and/or other parameters of the pipeline during its laying operation, and the movement between the pipeline and vessel is generally controlled by one or more apparatus or devices intended to grip and/or apply tension to the pipeline during its passage through the marine pipelay assembly. Suitable devices or apparatus for this purpose are known as "tensioners".

An example of a tensioner is shown in FR2964441B1. FIG. 1 from this earlier patent is reproduced as FIG. 1 of the accompany drawings. Referring to FIG. 1, the tensioner (1A) comprises multiple continuous tracks (10A) which are adapted to engage the pipeline and support at least the weight of the pipeline. The tracks (10A) are each supported by a chassis (13A) which is mounted on a support structure (20A) by cylinders (26A). The cylinders (26A) provide relative movement of the tracks (10A) in order to provide clamping force from the tracks (10A) onto the pipeline. This allows the pipeline to be held in place by friction between the tracks (10A) and the external surface of the pipeline. Each track (10A) comprises multiple pipe tensioner pads (16A) on its external, pipe contacting, surface. The friction is provided by the external, i.e. pipe contacting, surface of each pad, being formed from steel with a roughened surface or ridges or from a material having a relatively high coefficient of friction such as rubber or polyurethane. This pipe contacting surface, and in particular in the case of non-steel pipe contacting surface, is bonded to a rigid back plate, or support, in order to provide the pipe tensioner pad with the required mechanical strength. This back plate is conventionally made of steel.

The clamping force applied by the tensioner on the pipeline is a key parameter in pipe laying. An excessive clamping force may damage the pipeline. On the contrary, insufficient clamping force may lead to an unsuitable or unstable grip of the pipeline, and moving the pipeline in an uncontrolled manner may damage the pipeline and affect security of nearby users or operators. Thus, it is beneficial to measure the clamping force applied by a tensioner.

It is known to measure the clamping force applied by a tensioner using 'test pipes' having a built-in strain gauge, such that the strain gauge once inserted into a pipe tensioner records local variations in pad loading. However, this is a discrete and indirect methodology, and cannot provide any information concerning variations in pipelines passing through the pipe tensioner. For example, most pipelines to be laid under water, such as rigid pipelines are formed from a series of pipe 'stalks' welded to each other, with the welding zone coated to provide additional protection around the weld. This is known as 'field joint coating'. However, the field joint coated section is typically thicker than the other parts of the pipeline, which will create a change in the necessary clamping force which the operator needs to take account of as the pipeline diameter varies during pipeline laying. In addition, axial and side loads cannot be measured with such methodology, but such values would provide beneficial guidance on the behaviour of the pad, and thus on the efficiency of the handling of the pipeline by the tensioner.

It is an object of the present invention to provide an improved pipe tensioner and a method of monitoring pipeline loading able to provide 'real time' information.

STATEMENT OF INVENTION

According to one aspect of the invention, there is provided a pipe tensioner for laying or recovering a subsea pipeline comprising at least two opposing continuous tracks able to hold the subsea pipeline, each track having a plurality of pads mounted on the continuous track for contacting the subsea pipeline, characterised in that at least one pad is a load pad comprising one or more load sensors for measuring loading on the load pad during handling of the subsea pipeline.

According to a second aspect of the invention, there is provided a method of monitoring the loading between a subsea pipeline, and a pipe tensioner for laying or recovering the subsea pipeline, the pipe tensioner comprising at least two opposing continuous tracks able to hold the subsea pipeline, and each track having a plurality of pads mounted on the continuous track for contacting the subsea pipeline, comprising at least the steps of:

providing at least one pad as a load pad comprising one or more load sensors for measuring loading on the load pad during handling of the subsea pipeline; and measuring the loading on the or each load pad.

According to a third aspect of the invention, there is provided a marine pipelay assembly comprising a pipe tensioner as defined herein.

Optionally, the present invention also provides a method of laying or recovering a marine pipeline from or to a pipe-laying vessel, the vessel comprising a marine pipelay assembly comprising a pipe tensioner as defined above, the method comprising the steps of:

(a) providing the pipeline through the marine pipelay assembly, (b) contacting an outer surface of the pipeline with the pads, at least one pad being a load pad comprising one or more load sensors for measuring loading on the load pad during handling of the subsea pipeline and (c) moving or holding the pipeline in the marine pipelay assembly to help lay or recover the pipeline.

Optionally, the present invention also provides a method of spooling a marine pipeline to or from a reel, the method comprising the steps of:

(a) providing the pipeline through a pipe tensioner comprising a plurality of pads, at least one pad being a load pad comprising one or more load sensors for measuring loading on the load pad during handling of the subsea pipeline, (b) contacting an outer surface of the pipeline with the pipe contacting surface of the or each pads, and (c) moving the pipeline to or from the reel.

BRIEF DESCRIPTION OF THE DRAWINGS

This invention will be further described by reference to the following Figures which are not intended to limit the scope of the invention claimed, in which:

DETAILED DESCRIPTION

Figure 1:
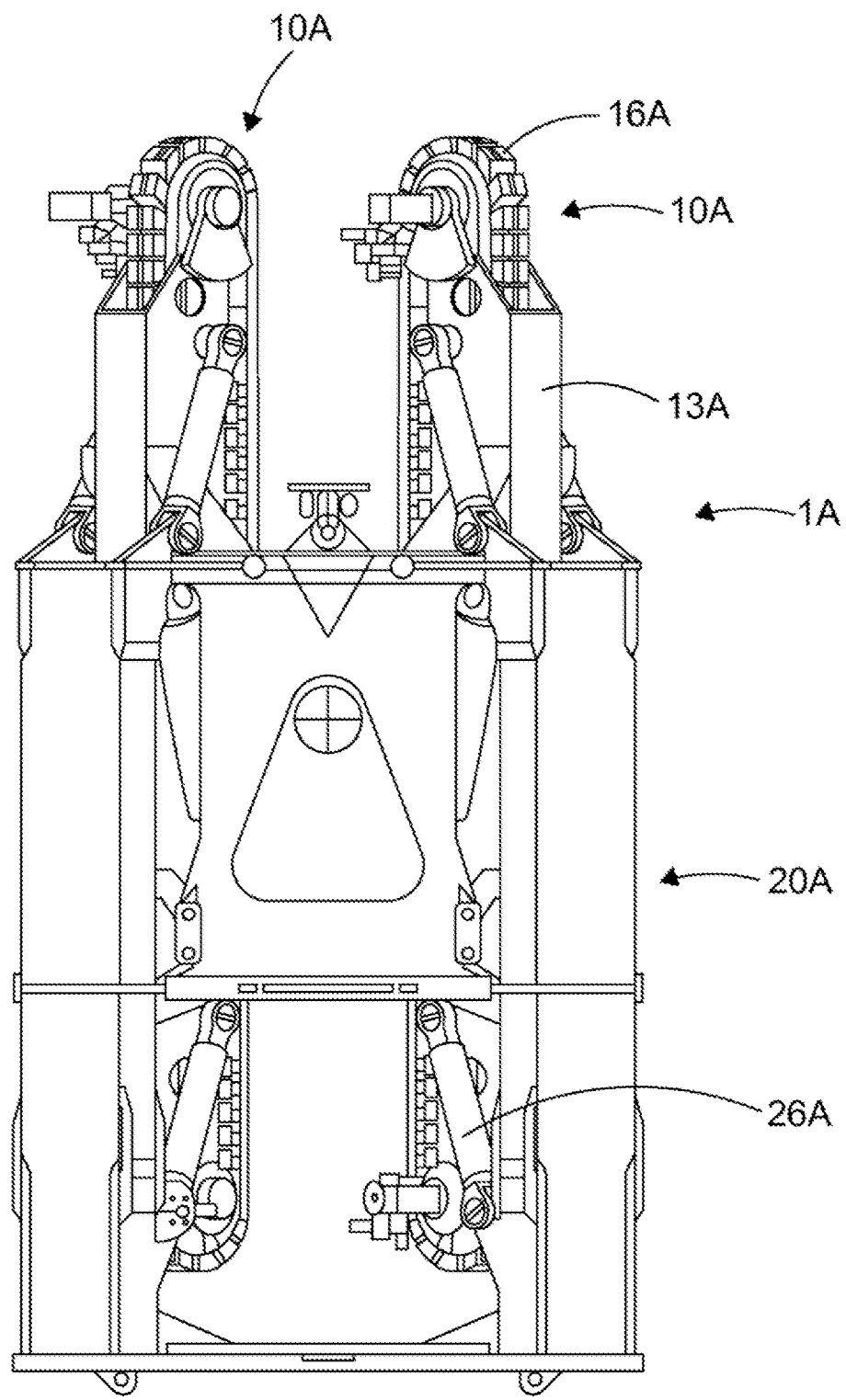
FIG. 1 shows a prior art tensioner.

The present invention provides a pipe tensioner comprising at least two opposing continuous tracks for handling a subsea pipeline, typically being either laying the subsea pipeline from a vessel, or recovering the subsea pipeline onto a vessel, and typically in, on or through a marine pipelay assembly, wherein at least one pad on one of the tracks of the pipe tensioner is a load pad comprising one or more load sensors for measuring loading on the load pad during handling of the subsea pipeline. According to the present invention, the term "laying" encompasses all the operations involved in the laying of the subsea pipeline including, but not limited to, spooling and/or unspooling a subsea pipeline on or from a reel located on a pipe-laying vessel.

The shape, design, form or arrangement of the pipe tensioner is not limiting on the present invention. A pipe tensioner typically has 2, 3 or 4 opposing continuous tracks, generally in a symmetrical arrangement around a pipeline pathway therethrough. Typically, the pipe tensioner is supported by or within a tower, sometimes termed a pipelay tower, which can be part of the marine pipelay assembly.

Such a tower provides the direction or 'firing line' for the subsea pipeline, especially during laying.

It is an expected function of the pipe tensioner to handle the subsea pipeline during laying or recovering with expected amount of control, including at an appropriate speed. Optionally this includes being to be able to hold or pause any pipeline movement when it is desired to carry out one or more other actions during pipeline laying or recovering, such as adding an intermediate unit, device or apparatus into the pipeline, joining pipeline sections or stalks, or conducting known subsea operations on a pipeline. Thus, the pipe tensioner is expected to be able to provide the correct amount of tension in the form of the clamping force at all times.

Typically, the overall clamping force from the tracks onto the pipeline is provided by cylinders between a tensioner support structure and a chassis for each track, and is distributed between the pads of each tensioner track in contact with the subsea pipeline during laying or recovering of the subsea pipeline. The distribution of the overall clamping force may be uniform or heterogeneous between each of such pads. This overall distributed clamping force is considered to be the loading between the subsea pipeline and the pipe tensioner.

During the handling and passage of a pipeline through a pipe tensioner, the pad withstands one or more of three main forms of loading, being axial loading (Fx), normal loading (Fz), and side loading (Fy). The axial loading (Fx) is the component of the loading parallel to the longitudinal axis of the pipeline. The normal loading (Fz) is the component of the loading oriented along the radius of the pipeline joining the centre of the pipe contacting surface of the pad. The side loading (Fy) is the component of the loading orthogonal to the axial loading and normal loading. These loads lead to one or more of compressive, shear, torsion and bending stress on the pad. Normal loading on each pad of the continuous tracks can be up to 425 kN, generally between 50 kN and 368 kN; axial loading on each pad of the continuous tracks can be up to 85 kN, generally between 3 kN and 35 kN and side loading on each pad can be up to 95 kN, generally between 0.75 kN and 105 kN. Any variation in the pipeline, in particular in the pipeline diameter, will clearly change the loading between the pipeline and the pipe tensioner.

The shape, design, form or arrangement of the continuous tracks of the pipe tensioner are not limiting on the present invention, and are generally in the form of an elongate arrangement around one or more end rollers or drums of a support chassis, at least one of which is driven by a suitable drive apparatus or mechanism in order to create 'conveyor belt' type movement of the continuous tracks in a manner known in the art. The continuous tracks and their chassis are not further described herein.

Conventional pads used on conventional continuous tracks of a pipe tensioner are well known in the art. A conventional pad typically comprises a track support portion and a pipeline engaging portion. The track support portion may include a base or a plate, such as a base plate or a back plate, which can be rigid, and which is designed to provide the engagement and securement of the pad to the continuous track using one or more known fittings or fixtures.

The pipeline engaging portion of a conventional pad can have a pipe contacting surface formed from a material with a relative high coefficient of friction, such as rubber or polyurethane or steel. The pipe contacting surface may also comprise a roughened surface or ridges or the like, to assist engagement between the pad and the pipeline. The uppermost part of the pipeline engaging portion, such as any pipe contacting surface, can be shaped to improve the contact of the pad with a pipeline, such as having a valley which, in use, extends in a direction parallel to a longitudinal axis of the pipeline contacted by the surface and angled pipe engaging surfaces, in a manner known in the art. The longitudinal axis of the pipeline is that extending along the length of the pipeline.

A conventional pad can also have a housing arranged between a pipeline engaging portion and a track support portion. Such housing may be of any suitable shape such as a rectangular, circular or T shape. The housing may be formed of any suitable material such as plastics or metals. The intermediate housing may be secured to the pipeline engaging portion and/or to the track support portion by any means such as pins, bolts or adhesive.

A conventional pad can also have a spring block between the track support portion and the intermediate housing for providing the expected resilience of a pad. The spring block may be any suitable shape such as but not limited to rectangular shape, circular shape. The spring block may be formed of any suitable material such as rubber or polyurethane. Typically, the spring block transfers the pipeline load to the housing, which then transfers the load to the pipeline engaging portion. This can be done by contact between the housing and the pipeline engaging portion and/or through a shear key managed on the upper face of the housing.

Generally, the overall height of a conventional pad is between 100 mm and 250 mm, in particular between 200 mm and 250 mm. The overall height is measured from the lower part of a valley-line of the pipe contacting surface to the track support portion. The length of the conventional pad is generally between 150 mm and 250 mm, and the width is generally between 200 mm and 400 mm.

Generally, the stiffness of a conventional pad is between 9 kN/mm and 90 kN/mm, such as between 10 kN/mm and 25 kN/mm.

The present invention is defined by at least one pad of a pipe tensioner being a load pad comprising one or more load sensors. The term "load pad" is used herein to define a pad for a pipe tensioner that comprises one or more load sensors, able to monitor and preferably to provide at least one measurement of loading between a subsea pipeline and a pipe tensioner.

The load pad may have suitable shape, design, form or arrangement, within the requirement of being securable to a continuous track, and optionally matching with the or any conventional pads on the continuous tracks.

Optionally, a load pad has the same or similar height, width and length dimensions of a conventional pad, such that it can be directly used in an existing pipe tensioner through replacement of a conventional pad with a load pad. This also ensures that the load measured by the load pad is a 'real' load, i.e. the same as or similar to the load experienced by a conventional pad, which adds to the reliability and accuracy of the measurements provided.

The present invention is not limited by the number of load pads added to each, or some of, or all of the continuous tracks of the pipeline tensioner. A pipe tensioner having a plurality of continuous tracks may comprise a different number of load pads on each or some or all of the continuous tracks, including no load pads. Optionally, each pad of at least one of the continuous tracks, optionally both of the continuous tracks, is a load pad. Further optionally, each pad of a continuous track is a load pad.

Load sensors for measuring loading, are well known in the art. Typically, a load sensor includes a transducer that creates an electrical signal whose magnitude is proportional, typically directly proportional, to the force being applied to the load sensor. The electrical signal output can be one or more of the group comprising: a voltage change, a current change, or a frequency change, depending on the load sensor being used. Any electrical signal is typically small, for example being in the magnitude of millivolts, etc., and typically requires amplification. Load sensors can be provided in a range of shapes, sizes and dimensions.

Optionally, at least one load pad measures one or more of the group comprising: axial loading (Fx), normal loading (Fz) and side loading (Fy).

Optionally, the load pad has the same form of attachment and securement to a continuous track as a conventional pad. Optionally, the or each load pad used in the present invention comprises a track support portion and a pipeline engaging portion. The track support portion may include a base or a plate, such as a base plate or a back plate, in particular being rigid, and being able to provide the engagement and securement of the load pad to the continuous track. The track support portion may include one or more fixtures, fittings or apertures, able to allow one or more engagement pieces such as screws, bolts, pins, hooks or other fasteners, to achieve the engagement and securement of the load pad with the continuous track.

The pipeline engaging portion preferably has a pipe contacting surface formed from a material with a relative high coefficient of friction, such as rubber or polyurethane. Optionally, the uppermost part of the pipeline engaging portion such as any pipe contacting surface, is shaped to improve the contact of the load pad with a pipeline, such as having a valley and angled pipe engaging surfaces, in a manner known in the art.

Optionally, the inner surface of the pipe contacting surface is shaped or machined to fit one or more load sensors.

Optionally the external surface of the pipe contacting surface of a load pad is the same as a conventional pad.

The or each load sensor of a load pad may be located in any suitable location approximate to and/or on and/or within the load pad. Optionally, the or each load sensor is able to measure loading on the pipeline engaging surface of the pipeline engaging portion. Optionally, at least one load sensor is located between the track support portion and the pipeline engaging portion.

According to one embodiment of the invention, the load sensors are located within the pipeline engaging portion of a load pad.

Optionally, the load pad further includes an intermediate portion between a tracked support portion and a pipeline engaging portion, said intermediate portion including a housing or housings for one or more load sensors. The housing or housings may be formed integrally with either any tracked support portion or any pipeline engaging portion or both.

Thus, according to another embodiment of the invention, the load sensors are located between the pipeline engaging portion and the intermediate portion of a load pad.

Optionally there is no contact between the tracked support portion and a pipeline engaging portion other than through the or each load sensor. This provides a more accurate measure or measurement of the load or loads by the or each load sensor. Preferably, there is at least one clearance between the track support portion and the pipeline engaging portion.

Optionally, one or more of the group comprising a tracked support portion, a pipeline engaging portion, and an intermediate portion, are separable. A tracked support portion and a pipeline engaging portion and any intermediate portion may be releasably or non-releasably securable together using one or more securing means, including one or more from the group comprising: adhesives, pins, bolts, screws and fasteners. According to the example in which the securing means are pins, bolts or screws, the load pad preferably comprises 4 securing means.

In one embodiment of the present invention, there is a load sensor located between the intermediate housing and the pipeline engaging portion, and clearance between the intermediate housing and the pipeline engaging portion, to ensure that the overall loading is transferred to the load sensor. Such an arrangement has the additional advantage of reducing the need to remove the load sensor frequently, due to wear of the pipeline engaging portion. According to the example in which the securing means are pins, bolts or screws, the said securing means comprise a rod preferably extending through a bore formed in the pipeline engaging portion. Preferably, there is also a clearance between the bore and the rod to prevent the rod from withstanding loads during handling of the pipeline, the overall loads being transferred from the pipeline engaging portion to the intermediate portion through the load sensors.

Optionally, at least one load sensor is a load cell. Optionally the load cell is a three axis load cell. The compressive stiffness of the load cell should be at least superior to the compressive stiffness of a conventional pad. This should achieve more accurate and reliable measurement of the loading. The overall stiffness of the load pad should be the same or similar to the overall stiffness of a conventional pad, such as within +/−1% of the stiffness of the conventional pad.

Optionally, the or each load pad has at least 3 load sensors to increase the sensitivity of the load pad. Further optionally, the or each load pad has 4 load sensors to improve the stability of the load pad. Preferably the four load sensors are symmetrically located within the load pad.

Optionally, the pipe tensioner comprises one or more data recorders/storage media, data transmitters or both.

Data generated by a load pad can either be stored in any suitable data recorder/storage medium which may be proximate to and/or on and/or in the load pad, or could be transmitted, via any suitable transmission medium, wired or wireless, from the load pad to a separate location for storage and/or processing, or for further re-laying, or any combination thereof.

A data recorder/storage medium may comprise any form of data recording or memory device or apparatus, typically a memory chip or device or the like, able to record and/or store data for subsequent processing. Optionally, data on the data recorder is downloaded or relayed to an appropriate receiver for storage and/or processing and/or further relaying or transmission.

Optionally, a data transmitter includes one or more transmitters, optionally with an aerial, able to transmit data from the load pad to an appropriate receiver. An example includes wireless transmission to a wireless receiver either partly or fully located on the pipe tensioner or adjacent thereto or remote therefrom. Examples of wireless data transmission technologies include but are not limited to wi-fi, based on the IEEE 802.11 standards, and Bluetooth.

Optionally, the pipe tensioner includes one or more relay units or apparatus, able to relay data or other information from the load pad to one or more remote locations, such as the user or operator of the pipe tensioner, or a suitable control room or remote control location, via any suitable transmission medium, wired or wireless.

Optionally, the load pad comprises a wireless data transmitter. Optionally the wireless data transmitter is releasably secured to the intermediate housing. The wireless data transmitter can transmit real-time or buffered data generated by the load pad, or data that has been stored locally by the load pad prior to transmission. The data can be transmitted from the load pad to any one or more of the data recorders/storage media or relay units or the like mentioned.

Optionally, the load pad comprises a power pack for supplying power to the wireless data transmitter. Optionally, the power pack is releasably secured to the intermediate housing. Optionally, the wireless data transmitter and the power pack are releasably secured to opposite sides of the intermediate housing for improving the stability of the load pad.

The present invention also provides a method of monitoring the loading between a subsea pipeline and a pipe tensioner as described herein.

Subsea pipelines have been initially discussed herein, and are typically elongate, optionally having a length of many metres, including many kilometres, with a regular, typically circular, outer surface. The outer surface of the subsea pipeline is typically one or more coatings or protective sheaths, generally a polymeric protective sheath, against which the pads of a pipe tensioner engage. The subsea pipeline may be for transporting fluids and/or other underwater services, including subsea or seabed communications or chemical supply. The present invention is not limited by the nature of the subsea pipeline. Thus, the subsea pipeline includes a rigid subsea pipeline as well as a flexible subsea pipeline.

In the method of monitoring the loading, at least one of the pads of at least one of opposing continuous tracks is a load pad comprising one or more load sensors. The nature and action of a load pad and a load sensor are described herein, and apply equally to the method of measuring the loading according to the present invention.

The method also comprises the step of measuring the loading on the or each load pad. The measuring can be carried out using any suitable process or arrangement, typically based on the loading between a subsea pipeline and the load pad causing a deformation or strain on the one or more load sensors, which provide a measurement for example in the form of one or more electrical signal outputs, which can be measured and preferably recorded, either locally or remotely.

Optionally, the method of the present invention further comprises the step of relaying the measuring of the loading to another processor and/or location.

The measuring of the loading may comprise a single figure or value, or may comprise a plurality of measurements or values, which can either be processed individually or processed in an aggregate manner, to provide a final measurement or set of data.

For example, a measurement of the 'normal' loading can help to indicate how the clamping force of the tensioner is distributed on the pipe. Such information can help to detect any overload on a pad or the pipe, such as on a field joint coating zone or a lack of clamping.

And/or a measurement of the axial loading can help indicate how the overall clamping force is withstanding, and how it is distributed between each pad and/or within a pad and/or on the pipe.

In addition, during pipe laying, wave motion may result in large and repetitive tensile stress variations of the pipe that can lead to fatigue of said pipe. Hence, axial load measurement can help provide guidance on tensile stress variations during pipe laying and thus a better understanding of the fatigue of the pipe during laying. Such data can be used subsequently for validating pipe design or for improving its design for future projects. Meanwhile, a measurement of the side loading can help indicate distribution of the clamping force within a pad.

According to one embodiment of the present invention, the method of the present invention further comprises real time measuring of the loading. The real time measuring can be carried out either intermittently, continuously, or a combination of the same, optionally with regular or irregular periodic frequency, or periodic changes thereinbetween. Optionally, the operator of the pipe tensioner is able to measure the loading between a subsea pipeline and the pipe tensioner in a pre-determined arrangement, regime or sequence, and/or during handling of the subsea pipeline passing through the pipe tensioner. Optionally, the time or timing of the measuring of the loading is variable during use of the pipe tensioner to allow the operator to vary the measuring, and to have variation in the data provided by the method of the present invention.

Optionally, the method of the present invention comprises continuous measuring of the loading, in particular during passage of a subsea pipeline through the pipe tensioner.

Optionally, the method of the present invention further comprises the steps of:
providing at least one pad as a load pad able to measure one or more of the group comprising: axial loading, normal loading and side loading; and
measuring one or more loadings on the load pad.

The nature and design of the one or more load pads are described herein, and apply equally to the method of the present invention.

Optionally, the method of the present invention comprises measuring and recording of the loading of each load pad in the pipe tensioner.

Optionally, the method of the present invention comprising measuring the loading along at least one axis of the load pad, further optionally all three axes of the load pad.

Optionally, the load pad comprises a track support portion and a pipeline engaging portion, and the method of the present invention further comprises the step of locating one or more load cells between the track support portion and the pipeline engaging portion, transferring the overall loading from the track support portion to the pipeline engaging portion through the one or more load cells, and measuring the loading on the load pad using the one or more load cells. The nature and design of a track support portion and a pipeline engaging portion are described herein, and apply equally to the method of the present invention. Further optionally, the load pad includes an intermediate portion, optionally having a housing for one or more load cells, as further described herein.

Optionally, the method of the present invention further comprises the steps of:
moving a subsea pipeline through the pipe tensioner using the opposing continuous tracks; and
monitoring the passage of the subsea pipeline through the pipe tensioner based on measuring the loading on the or each load pad.

Optionally, the method of the present invention comprises a pipeline tensioner having at least two, such as two or four, opposing tracks, each track has at least one load pad in a symmetric and opposing position, and further comprising the steps of:
moving a subsea pipeline through the pipe tensioner using the opposing continuous tracks; and
monitoring the loading on the tensioner during engagement of the symmetric and opposing load pads against the pipeline.

The present invention also provides a marine pipelay assembly comprising a pipe tensioner as defined herein. Typically, the marine pipelay assembly includes a tower, which tower includes the pipe tensioner. The marine pipelay assembly is typically arranged on a sea-going vessel, either being a ship or a barge or similar, and may also be moveable, in particular rotational to provide an 'angled' pipeline laying direction in relation to a vessel. The marine pipelay assembly may include one or more other supports, chassis, or pipe tensioners in line with the pipe tensioner of the present invention.

Figure 2:
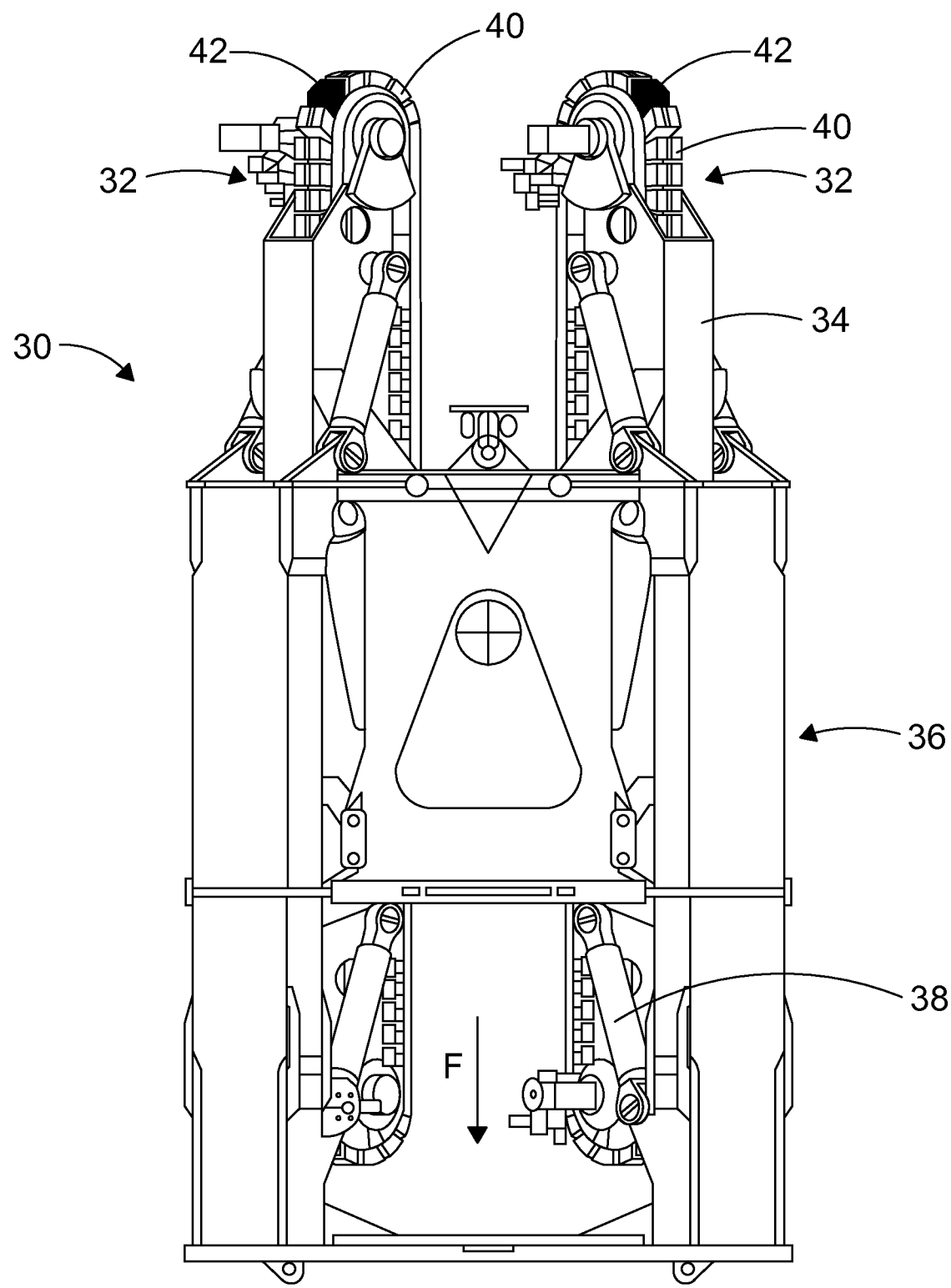
FIG. 2 shows a pipe tensioner according to an embodiment of the invention.

FIG. 2 shows a simplified version of a pipe tensioner 30 being similar to the tensioner 1A shown in FIG. 1, and comprising multiple continuous tracks 32 which are adapted to engage a subsea pipeline (not shown) and support at least the weight of the pipeline as it travels either in the direction F as shown or an opposite direction.

The continuous tracks 32 are driven by motors (not shown), and are each supported by a chassis 34 mounted on a support structure 36 by cylinders 38. The cylinders 38 provide relative movement of the tracks 32 in order to provide clamping force between the tracks 32 and the pipeline.

Each continuous track 32 comprises multiple conventional pipe tensioner pads 40, and at least one load pad 42 comprising one or more load sensors, examples of which are described hereinafter.

The pipe tensioner 30 can be part of a marine pipelay assembly.

Figure 3:
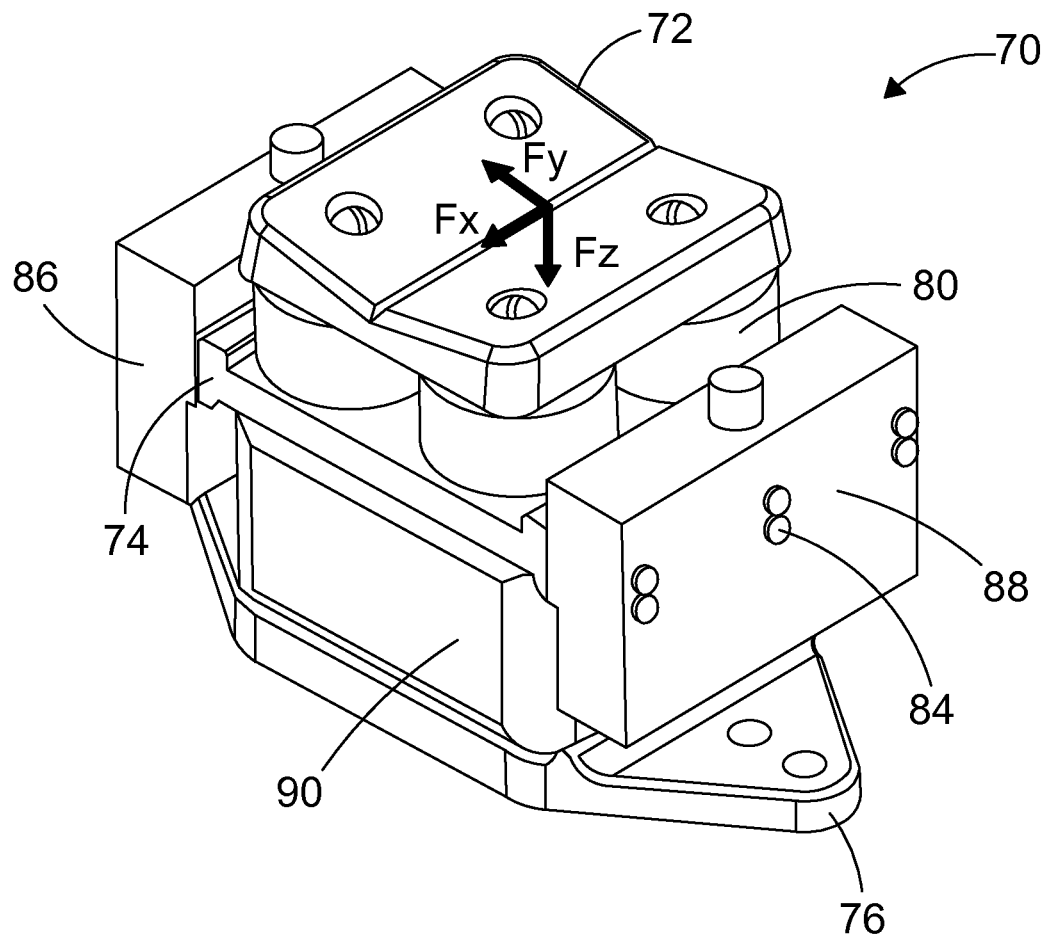
FIG. 3 is a perspective view of a first load pad useable in a pipe tensioner according to an embodiment of the invention.

FIG. 3 shows a first load pad 70 useable in the present invention. The first load pad 70 has a pipeline engaging portion 72, an intermediate housing 74, and a base plate 76. The first load pad 70 also has a spring block 90.

The pipeline engaging portion 72 may be formed of an upper casting, typically having a valley-line shape to assist engagement with a pipeline in use.

The intermediate housing 74 houses four load cells 80 located between an upper surface of the intermediate housing 74 and the pipeline engaging portion 72. In particular, each load cell 80 is bolted to the intermediate housing 74 and the pipeline engaging portion 72.

The first load pad 70 can be used as the load pad 42 in the pipe tensioner 30 shown in FIG. 2. The base plate 76 of the first load pad 70 includes apertures for securement of the first load pad 70 to a continuous track. The spring block 90 is secured between the base plate 76 and the intermediate housing 74. The spring block 90 has a rectangular body with a central hollow core.

FIG. 3 also shows the first load pad 70 having a power pack 86 and a wireless transmitter 88. The power pack 86 can provide power required to operate the wireless transmitter 88. The wireless transmitter 88 provides the ability to send a measurement or data in the form of a signal to a suitable remote data logger for processing, or to a suitable relay located nearby on the pipe tensioner. The power pack 86 and the wireless transmitter 88 are secured to the sides of the intermediate housing 74 by bolts 84.

Figure 4:
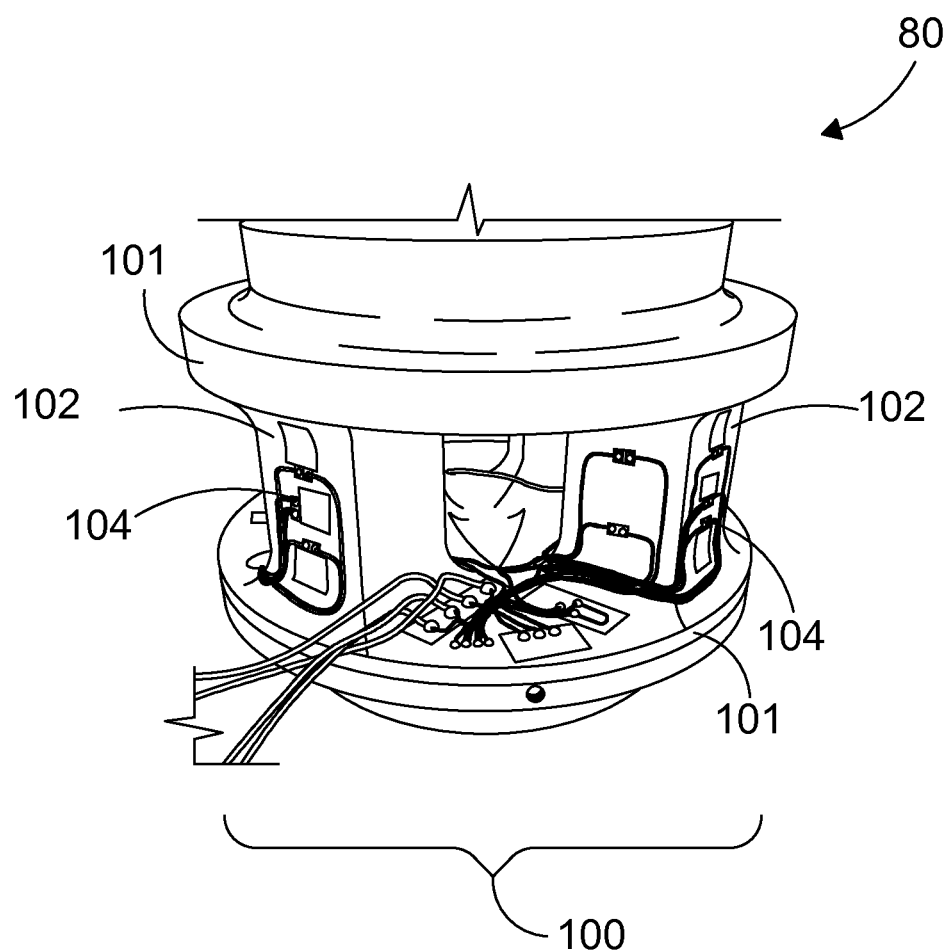
FIG. 4 is a detailed view of a load sensor useable in the first load pad shown in FIG. 3.

FIG. 4 shows detail of a load cell 80 in FIG. 3, wherein the load cell 80 is a separable unit from the remainder of the first load pad 70, and which can therefore be removed in case of failure. This also enables easier calibration of the load cell 80 prior to its installation within the first load pad 70, at or with a test bench.

The load cell 80 may comprise a main core 100 having a cross section which is or is almost constant. The main core 100 generally has a cylindrical shape. The main core 100 preferably comprises top and bottom covers 101, and at least one support or foundation 102 located between the covers 101. Optionally, the main core 100 comprises at least two foundations 102; more optionally four foundations 102, generally in a symmetric configuration between the top and bottom covers 101, as shown in FIG. 4.

Optionally, the cross section and the height of the or each foundation 102 enable an accurate measure of the load imposed on the load cell 80.

In one embodiment of the present invention, the main core of the load cell 80 is machined from one single piece or block of material, so as to form a unitary assembly. For example, the top and bottom covers 101 and the foundations 102 shown in FIG. 4 could be formed from a single block of suitable material.

FIG. 4 shows a transducer 104 attached to each foundation 102. Generally, load applied to the first load pad 70 leads to an electrical resistance change of the transducers 104 that is proportional and/or directly proportional to the load applied. As various parameters (such as temperature) may also induce electrical resistance variation, the transducers 104 are preferably arranged to compensate for any electrical resistance variation induced by such parameters other than the load. Hence the final measurement is preferably not affected by temperature or other such parameters.

Figure 5A:
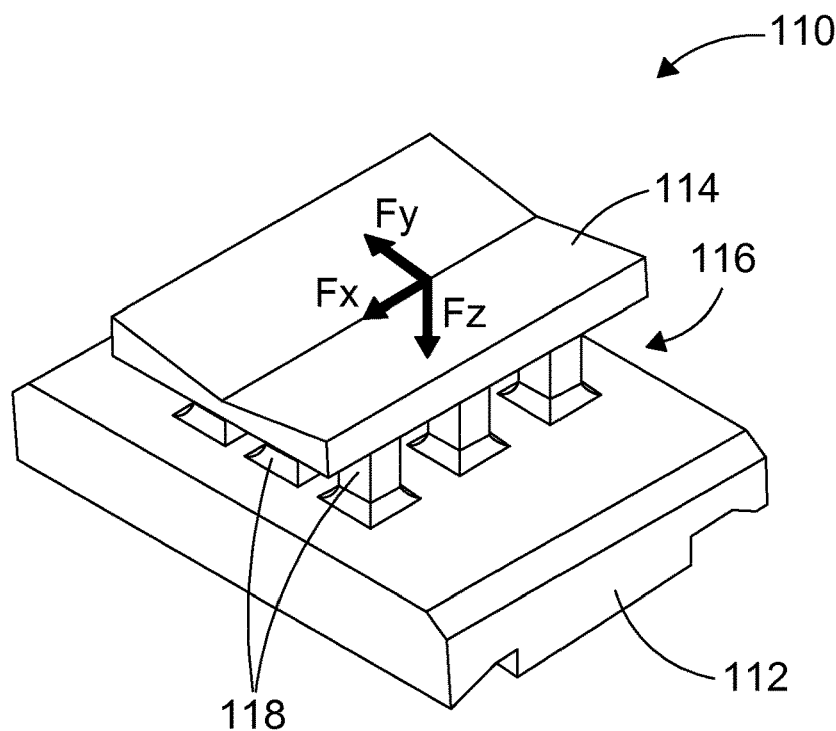
FIGS. 5a and 5b are perspective and side views of a second load pad useable in a pipe tensioner according to an embodiment of the present invention.
Figure 5B:
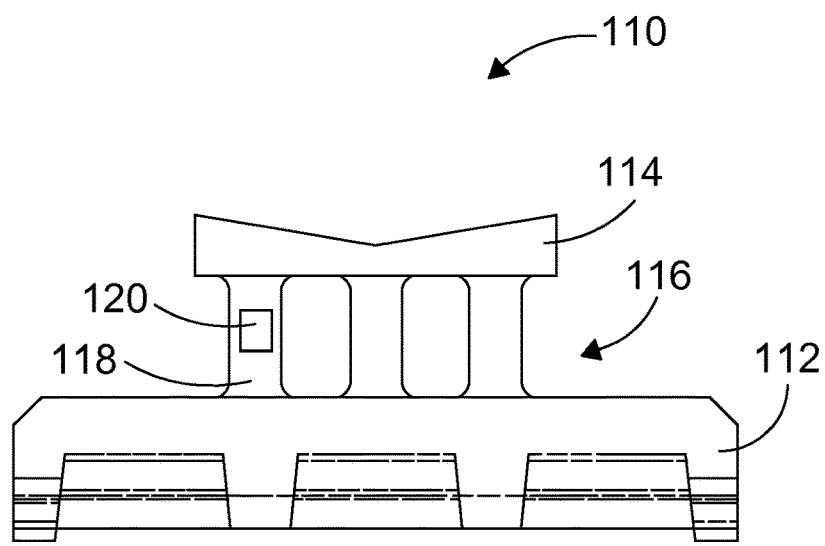

FIGS. 5a and 5b show a second load pad 110 having a track support portion 112, a pipeline engaging portion 114, and a load sensor 116 located between the track support portion 112 and the pipeline engaging portion 114. The pipeline engaging portion 114, load sensor 116 and track support portion 112, may all be machined from one piece or block of suitable material, such as but not limited to, steel. In this way, the pipeline engaging portion 114, load sensor 116 and track support portion 112 are thus 'fixed' together, to provide a more robust and compact load pad.

Optionally in the second load pad 110, the load sensor 116 comprises one or more foundations 118, each foundation 118 optionally having one or more transducers 120 thereon. Generally, load applied to the load pad 110 leads to an electrical resistance change of the transducer(s) 120 that is proportional and/or directly proportional to the load applied. Again, as various parameters (such as temperature) may also induce electrical resistance variation, the transducers 120 are preferably arranged to compensate for any electrical resistance variation induced by such parameters other than the load. Hence the final measurement is preferably not affected by temperature or other such parameters. Typically, there are several transducers 120 per foundation 118, generally five transducers per foundation 118. Having multiple transducers per foundation can provide an improved or more accurate assessment of the overall track performance.

Optionally, the load sensor comprises from six to nine foundations. FIGS. 5a and 5b show the second load sensor having nine foundations 118. The number, the cross-section and the height of the or each foundation allow for an accurate measure of the load.

Figures 6A, 6B:
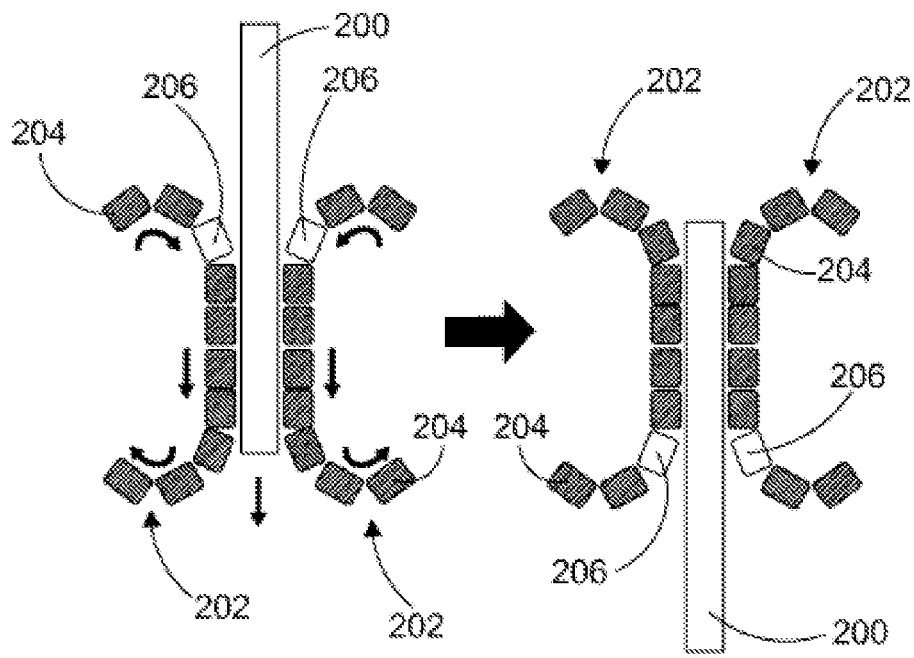
FIGS. 6a and 6b show schematic side views of two positions of a pipeline passing through a pipe tensioner according to an embodiment of the invention.

FIGS. 6a and 6b show schematic views of a method of monitoring the loading between a subsea pipeline 200 and two opposing continuous tracks 202 of a pipe tensioner (not otherwise shown), such as the pipe tensioner shown in FIG. 2.

FIGS. 6a and 6b show in diagrammatic form each continuous track 202 having a number of conventional tensioner pads 204, and one load pad 206 comprising one or more load sensors according to the present invention, (such as the first and second load sensors 70, 110 described hereinbefore). The load pads 206 are in a symmetric and opposing position.

FIGS. 6a and 6b show in diagrammatic form movement of the opposing tracks 202 in a known manner, typically in opposing symmetric motion, to move the pipeline 200 downwardly thereinbetween in a manner known in the art.

FIG. 6a shows the movement of the load pads 206 of the present invention to initially engage the pipeline 200 and travel along with the pipeline 200, until they disengage with the pipeline 200 as per FIG. 6b after travelling the length of the engagement portion of the pipe tensioner.

Thus, FIGS. 6a and 6b show moving a subsea pipeline 200 through the pipe tensioner using the opposing continuous tracks 202, and monitoring the passage of the subsea pipeline 200 through the pipe tensioner based on measuring the loading on the or each load pad 206 by monitoring the loading on the tensioner during engagement of the symmetric and opposing load pads 206 against the pipeline 200. Optionally the method comprises measuring the compressive and shear loadings on the load pads 206.

Figure 7:
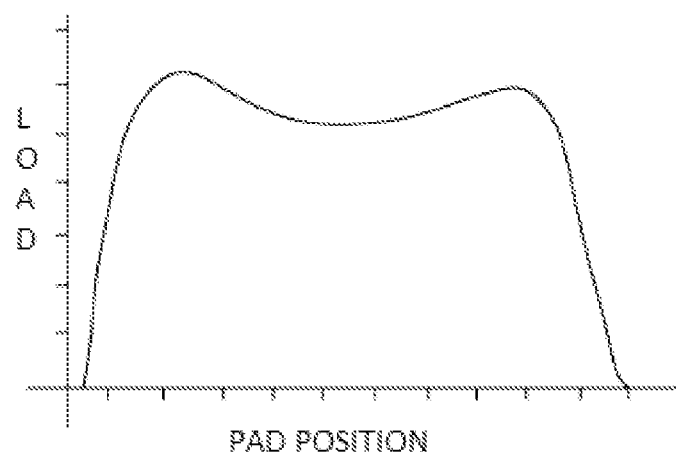
FIG. 7 shows a graph of the loading versus load pad position derived from FIGS. 6a and 6b.

FIG. 7 is an illustrative depiction, of time and the load pad position during the passage of time. The time in units of time and local pad positions show pad positions at various times. FIG. 7 shows a continuous, and optionally real time, graph of the continuous measurement of load on the vertical y-axis by the load pads 206 against the position of the pipeline as it passes through the pipe tensioner (and/or against time) as shown on the horizontal x-axis. The peaks along the x-axis show the positions of the supporting hydraulic cylinders. Thus, FIG. 7 shows an initial 'zero' loading for the arrangement shown in FIG. 6a, with the loading rising rapidly to a first peak on the vertical y-axis as the load pads 206 first engage with the pipeline 200. The first peak is followed along the x-axis by a small reduction in loading on the vertical axis as the load pad 206 travels downwardly with the pipeline 200 between FIGS. 6a and 6b, followed by a second peak as the load pad 206 disengages with the pipeline 200 shown in FIG. 6b.

FIG. 7 shows a profile of compressive loading along a pipeline, which allows an operator or user to understand how the loading is occurring for that pipeline, and to either confirm its appropriateness, or how the tensioner could perform for the same or similar pipeline. This information can be provided by the operator or user modifying or replacing conventional pads in the pipe tensioner, and different load pads can be provided to either replace different types of conventional pads and/or to work with different types of pipe tensioners.

The data in FIG. 7 could be provided in real time, by transmission of the load measurements to a suitable processor, such as a nearby laptop or computer, etc., optionally via one or more relays, or the data could be stored the load pads 206 for subsequent downloading and processing.

The data in FIG. 7 could also be used as means to calculate or as an indication of fatigue or wear of a part of the pipe tensioner, such as the pad surfaces, the roller bearings, or cylinders, etc., where a different loading profile is detected, and/or to detect any overloading or underloading between the pipeline and the pipe tensioner. For example, the present invention could help indicate the presence of 'Field Joint Coatings' as discussed herein, and their correct location, thickness etc, but detected expected variation in the loading. This data could also provide information on the friction behaviour between the pad and the pipeline during laying.

The present invention provides a pipe tensioner and a method able to measure and optionally record both compressive and shear loading, and to capture the effect of various pipeline types on a pipe tensioner, unlike a standard test piece of pipeline having a strain gauge thereon. The data recording can be completed onshore or offshore during live installations in particular based on the use of a wireless data transmitter, and allows additional functionality such as the ability to post-process data live for fatigue and/or load monitoring.

The present invention also facilitates the testing of long pipe tensioners, which is not possible with known test pipes, which only come in 'standard' short lengths.

The present invention also allows testing of a pipe tensioner to be carried out at high pipelay speeds, in particular at a full or 'normal' pipelay speed, again unlike standard test pipes.

The present invention also allows measuring of a total load applied to a pipeline if the continuous tracks are provided with sufficient loads pads according to the present invention along their lengths.

The present invention allows data to show the profile of compressive and/or shear loading along a pipeline or track length, which allows an operator or user to foresee loadings of different pipeline products, including rigid pipes or flexible pipes or umbilicals, especially pipeline products of different diameters, and to be prepared for differences in compressive stiffness or frictional behaviour of certain pipelines.

The present invention can also be applied either in a test environment onshore, or in at test environment offshore or during offshore laying or recovering operations.

The present invention can also be used to validate predictive modelling of pipeline laying or recovering operations, allowing faster or otherwise quicker actual pipeline laying or recovering operations, saving the large OPEX involved in pipeline laying or recovering operations.

The invention claimed is:

1. A pipe tensioner for laying or recovering a subsea pipeline comprising at least two opposing continuous tracks able to hold the subsea pipeline, each track having a plurality of pads mounted on the continuous track for contacting the subsea pipeline, wherein at least one of the pads is a load pad comprising one or more load sensors for measuring loading on the load pad during handling of the subsea pipeline, wherein the load pad comprises a track support portion and a pipeline engaging portion, and wherein at least one load sensor is located in a space between the track support portion and the pipeline engaging portion.

2. The pipe tensioner as claimed in claim 1, wherein each pad of at least one of the continuous tracks is a load pad.

3. The pipe tensioner as claimed in claim 1, wherein the load pad measures one or more of a group comprising: axial loading, normal loading and side loading.

4. The pipe tensioner as claimed in claim 1, comprising clearance between the track support portion and the pipeline engaging portion.

5. The pipe tensioner as claimed in claim 1, wherein at least one of the one or more load sensors is a load cell.

6. The pipe tensioner as claimed in claim 5, wherein the load cell is a three axis load cell.

7. The pipe tensioner as claimed in claim 1, wherein the load pad has at least three load sensors.

8. The pipe tensioner as claimed in claim 1, wherein the load pad has four load sensors.

9. The pipe tensioner as claimed in claim 1, further comprising one or more data recorders, data transmitters, or both.

10. The pipe tensioner as claimed in claim 1, wherein the load pad comprises a wireless data transmitter.

11. A marine pipelay assembly comprising a pipe tensioner as defined in claim 1.

12. The pipe tensioner as claimed in claim 1, wherein each pad of each of the continuous tracks is a load pad.

13. A method of monitoring the loading between a subsea pipeline, and a pipe tensioner for laying or recovering the subsea pipeline, the pipe tensioner comprising at least two opposing continuous tracks able to hold the subsea pipeline, and each track having a plurality of pads mounted on the continuous track for contacting the subsea pipeline, comprising at least the steps of:

providing at least one pad of the plurality of pads as a load pad comprising a track support portion, a pipeline engaging portion, one or more load sensors located in a space between the track support portion and the pipeline engaging portion to measure loading on the load pad during handling of the subsea pipeline; and measuring the loading on the load pad.

14. The method as claimed in claim 13, further comprising the step of relaying the measuring of the loading as applied to another location.

15. The method as claimed in claim 13, further comprising the step of recording the measuring of the loading as applied on the or each load pad.

16. The method as claimed in claim 13, further comprising real time measuring of the loading.

17. The method as claimed in claim 13, further comprising continuous measuring of the loading.

18. The method as claimed in claim 13, wherein the load pad is able to measure one or more of a group comprising: axial loading, normal loading and side loading, and the method further comprising:

measuring one or more of axial loading, normal loading and side loading on the load pad.

19. The method as claimed in claim 13, further comprising the steps of:

locating one or more load cells between the track support portion and the pipeline engaging portion of the load pad, transferring an overall loading from the track support portion to the pipeline engaging portion through the at least one or more load cells; and measuring the loading on the load pad using the one or more load cells.

20. The method as claimed in claim 13, further comprising the steps of:

moving the subsea pipeline through the pipe tensioner using the opposing continuous tracks; and monitoring a passage of the subsea pipeline through the pipe tensioner based on measuring the loading on the load pad.

21. The method as claimed in claim 13, wherein the pipe tensioner has two or four opposing tracks, each track has at least one load pad in a symmetric and opposing position with another of the tracks, and further comprising the steps of:

moving the subsea pipeline through the pipe tensioner using the opposing continuous tracks; and monitoring the loading on the tensioner during engagement of the symmetric and opposing load pads against the pipeline.

* * * * *